US007464949B1

(12) United States Patent
Downey

(10) Patent No.: US 7,464,949 B1

(45) Date of Patent: Dec. 16, 2008

(54) WHEELCHAIR WHEEL POSITIONING SYSTEM

(76) Inventor: James R. Downey, 3121 Cobia Dr., Gautier, MS (US) 39553

(*) Notice: Subject to any disclaimer, the term of this patent is extended or adjusted under 35 U.S.C. 154(b) by 198 days.

(21) Appl. No.: 11/248,063

(22) Filed: Oct. 12, 2005

(51) Int. Cl.
*B62B 11/00* (2006.01)

(52) U.S. Cl. ................................ 280/250.1; 280/149.2

(58) Field of Classification Search ............. 280/250.1, 280/304.1, 149.2
See application file for complete search history.

(56) References Cited

U.S. PATENT DOCUMENTS

| | | | | |
|---|---|---|---|---|
| 3,185,495 | A * | 5/1965 | Pivacek | 280/657 |
| 3,618,968 | A | 11/1971 | Greer | 280/47.11 |
| 3,901,527 | A * | 8/1975 | Danziger et al. | 280/638 |
| 4,155,588 | A | 5/1979 | Danziger et al. | 297/115 |
| 4,310,167 | A * | 1/1982 | McLaurin | 280/5.28 |
| 4,326,732 | A * | 4/1982 | Gall et al. | 280/642 |
| 4,961,477 | A | 10/1990 | Sweeney | 180/219 |
| 4,997,200 | A | 3/1991 | Earls | 280/648 |
| 5,674,041 | A | 10/1997 | Smith, Jr. et al. | 414/345 |
| 5,884,929 | A | 3/1999 | Kincaid | 280/304.1 |
| 6,155,583 | A | 12/2000 | Koike | 280/250.1 |
| 6,419,260 | B1 * | 7/2002 | Kuroda | 280/647 |
| 6,802,518 | B2 | 10/2004 | Kuntz | 280/250.1 |
| 2004/0080137 | A1 | 4/2004 | Kuntz | 280/250.1 |

FOREIGN PATENT DOCUMENTS

| | | |
|---|---|---|
| GB | 2141980 | 1/1985 |
| JP | 5208035 | 8/1993 |

* cited by examiner

*Primary Examiner*—Kevin Hurley

(57) ABSTRACT

A wheelchair wheel positioning system for providing an unobstructed path into and out of a wheelchair. The wheelchair wheel positioning system includes a frame member fastened to a wheelchair frame, an actuation member pivotably connected to both a frame bar and a rear wheel of the wheelchair and a stabilizer member utilized for lifting and maintaining the wheelchair in place. The actuation member pivotally connects at one end to the frame member and pivotally connects near the middle to a rear wheel of the wheelchair. The stabilizer member is affixed near the middle of the actuation member at a preferred angle. As the actuation member and rear wheel are rotated rearward, the stabilizer member contacts the floor surface to lift the rear wheel that the wheelchair wheel positioning system is attached to and stabilizes the wheelchair for entry and exit.

4 Claims, 8 Drawing Sheets

NOTE: The wheelchair is shown for reference only; the wheelchair accessory is not part of the wheelchair.

NOTE: The wheelchair is shown for reference only;
the wheelchair accessory is not part of the wheelchair.

NOTE: The wheelchair is shown for reference only; the wheelchair accessory is not part of the wheelchair.

NOTE: The wheelchair is shown for reference only;
the wheelchair accessory is not part of the wheelchair.

NOTE: The wheelchair is shown for reference only;
the wheelchair accessory is not part of the wheelchair.

NOTE: The wheelchair is shown for reference only;
the wheelchair accessory is not part of the wheelchair.

WHEELCHAIR WHEEL POSITIONING SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to wheelchairs and more specifically it relates to a wheelchair wheel positioning system for providing an unobstructed path into and out of a wheelchair.

2. Description of the Related Art

Any discussion of the prior art throughout the specification should in no way be considered as an admission that such prior art is widely known or forms part of common general knowledge in the field.

Wheelchairs have been in use for years. Typically, wheelchairs have small forward wheels used for directional control and larger rear wheels with outer rails utilized for propelling the wheelchair. The rear wheels are positioned to allow the user to easily access them in order to manipulate the wheelchair as desired. Unfortunately, the wheelchairs in use today do not allow a user to easily move the rear wheels out of the path of access into and out of the wheelchair.

While these devices may be suitable for the particular purpose to which they address, they are not as suitable for providing an unobstructed path into and out of a wheelchair. Current wheelchair systems do not allow the user to easily move the rear wheels from the path of ingress or egress to the wheelchair.

In these respects, the wheelchair wheel positioning system according to the present invention substantially departs from the conventional concepts and designs of the prior art, and in so doing provides an apparatus primarily developed for the purpose of providing an unobstructed path into and out of a wheelchair.

BRIEF SUMMARY OF THE INVENTION

In view of the foregoing disadvantages inherent in the known types of wheelchairs now present in the prior art, the present invention provides a new wheelchair wheel positioning system construction wherein the same can be utilized for providing an unobstructed path into and out of a wheelchair.

The general purpose of the present invention, which will be described subsequently in greater detail, is to provide a new wheelchair wheel positioning system that has many of the advantages of the wheelchairs mentioned heretofore and many novel features that result in a new wheelchair wheel positioning system which is not anticipated, rendered obvious, suggested, or even implied by any of the prior art wheelchairs, either alone or in any combination thereof.

To attain this, the present invention generally comprises a frame member fastened to a wheelchair frame, an actuation member pivotably connected to both a frame bar and a rear wheel of the wheelchair and a stabilizer member utilized for lifting and maintaining the wheelchair in place. The actuation member pivotally connects at one end to the frame member and pivotally connects near the middle to a rear wheel of the wheelchair. The stabilizer member is affixed near the middle of the actuation member at a preferred angle. As the actuation member and rear wheel are rotated rearward, the stabilizer member contacts the floor surface to lift the rear wheel that the wheelchair wheel positioning system is attached to and stabilizes the wheelchair for entry and exit.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a wheelchair wheel positioning system that will overcome the shortcomings of the prior art devices.

A second object is to provide a wheelchair wheel positioning system for providing an unobstructed path into and out of a wheelchair.

Another object is to provide a wheelchair wheel positioning system that is easily manipulated by the user.

An additional object is to provide a wheelchair wheel positioning system that stabilizes the wheelchair during entry and exit by a user.

A further object is to provide a wheelchair wheel positioning system that is easily adapted to wheelchairs currently in use.

Another object is to provide a wheelchair wheel positioning system that does not interfere with normal usage of the wheelchair.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview

Figure 1A:
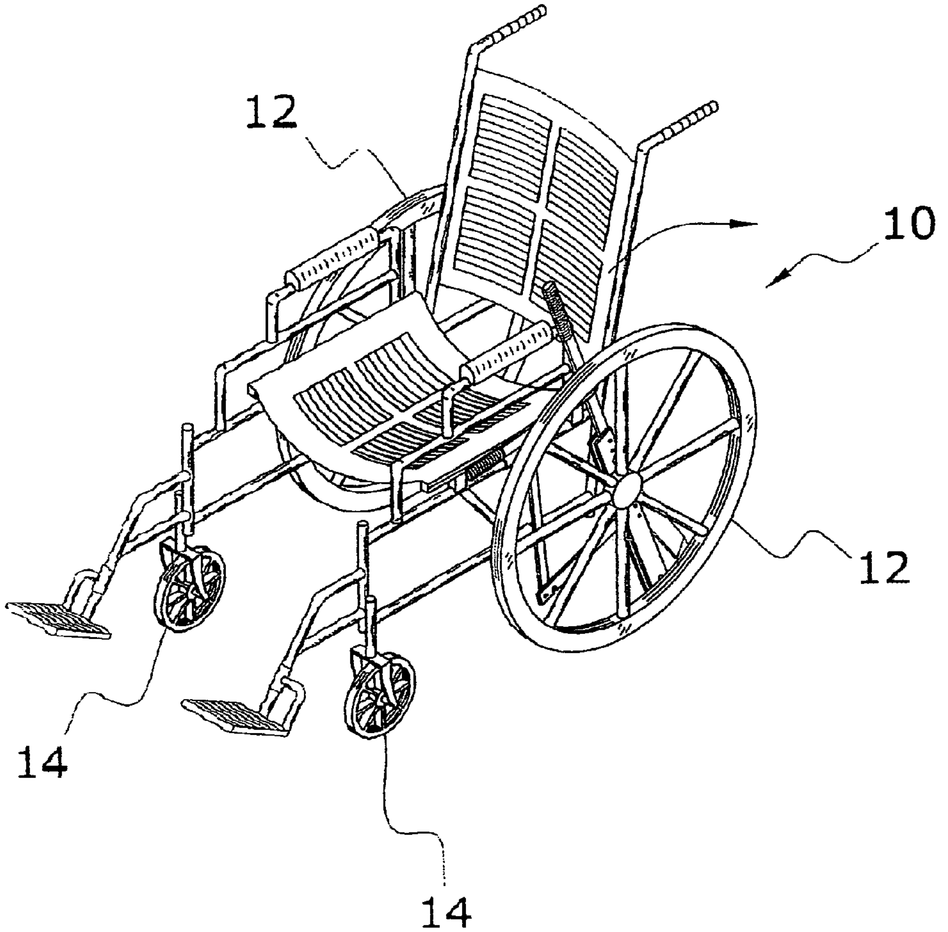
FIG. 1A is an upper perspective view of the present invention.

Turning now descriptively to the drawings, in which similar reference characters denote similar elements throughout the several views, FIGS. 1A through 4B illustrate a wheelchair wheel positioning system 10, which comprises a frame member 70 fastened to a wheelchair frame, an actuation member 20 pivotably connected to both a frame bar 70 and a rear wheel 12 of the wheelchair and a stabilizer member 50 utilized for lifting and maintaining the wheelchair in place. The actuation member 20 pivotally connects at one end to the frame member 70 and pivotally connects near the middle to a rear wheel 12 of the wheelchair. The stabilizer member 50 is affixed near the middle of the actuation member 20 at a preferred angle. As the actuation member 20 and rear wheel 12 are rotated rearward, the stabilizer member 50 contacts the floor surface to lift the rear wheel 12 that the wheelchair wheel positioning system 10 is attached to and stabilizes the wheelchair for entry and exit.

B. Actuation Member

The actuation member 20 is preferably made of a rigid material that will not significantly distort while supporting the weight of a user and wheelchair during normal usage of the wheelchair wheel positioning system 10. The actuation member 20 is preferably metal (e.g. aluminum, titanium), however, is not restricted from being molded in a plastic or composite material.

Figure 3A:
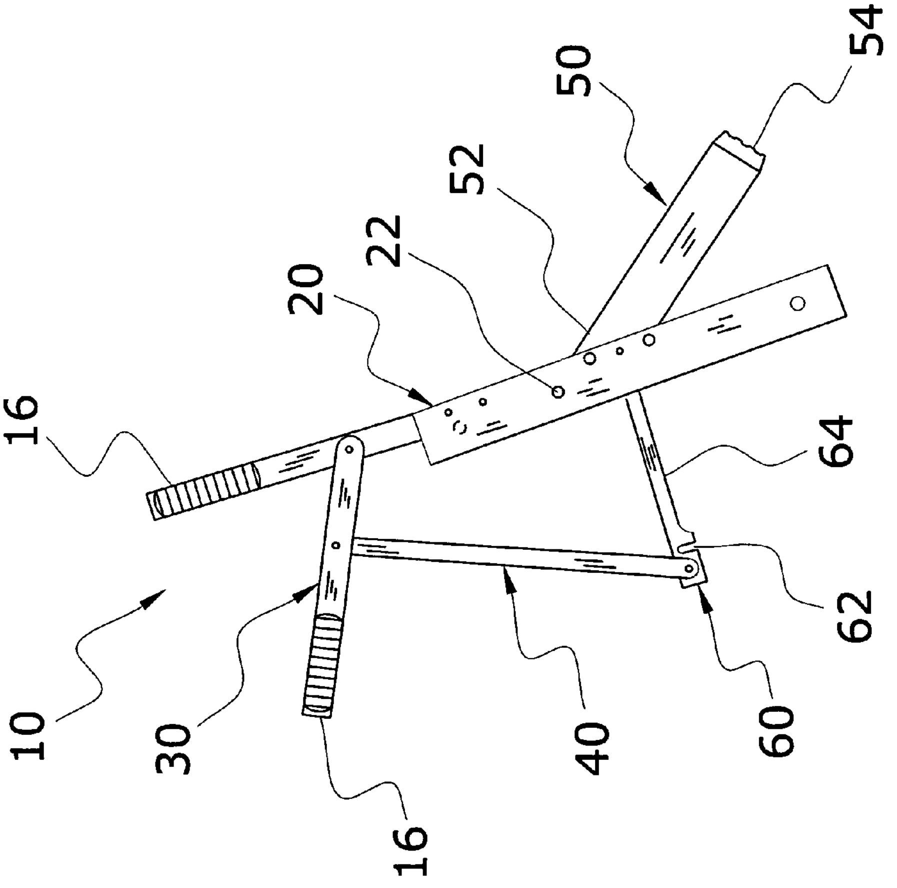
FIG. 3A is a side view of the present invention in the closed position for normal usage of the wheelchair.
Figure 3B:
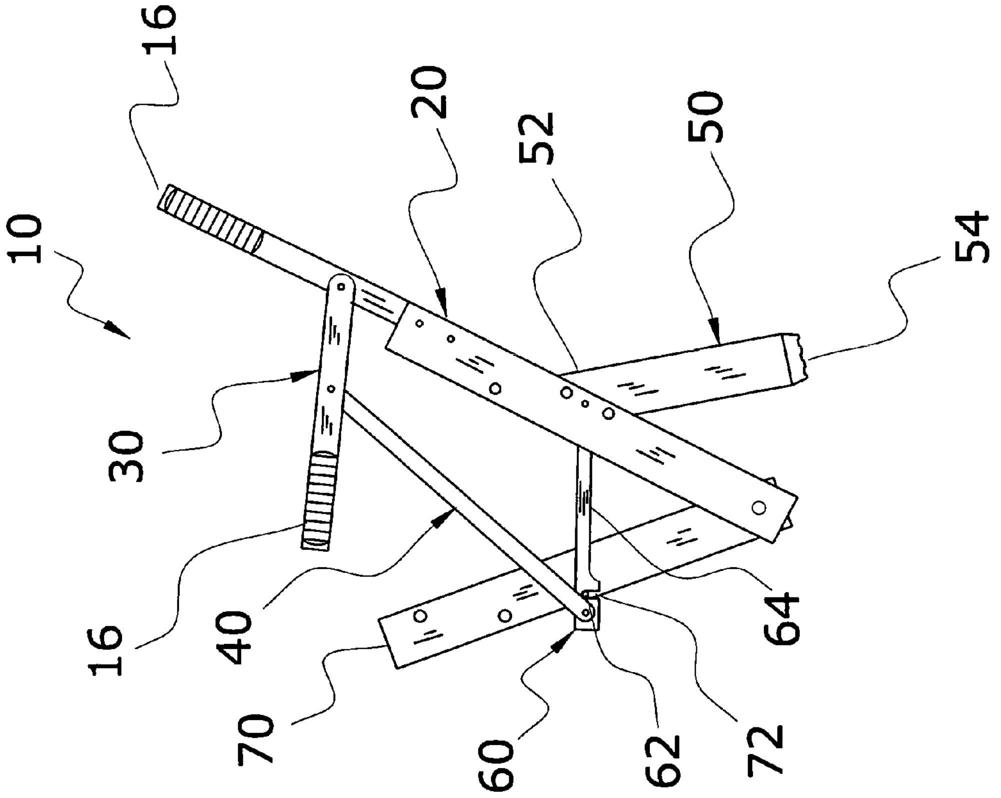
FIG. 3B is a side view of the present invention in the activated position for moving the rear wheel of the wheelchair rearwards.

As best illustrated in FIGS. 3A and 3B of the drawings, the actuation member 20 is preferably comprised of both a substantially straight and flat handle portion and wider body portion. The handle portion and body portion are preferably separate components attached together by fasteners or other methods (e.g. welded) or are a single component cut from a single sheet of material. The handle portion of the actuation member 20 preferably contains an aperture for pivotally attaching a handle member 30 and is sized to accept the attachment of a grip 16 to aid the user during use.

As shown in FIGS. 2A through 3B, the body portion of the actuation member 20 preferably contains a plurality of apertures for pivotally attaching a frame member 70, a stabilizing member 50 and a locating member 60. The body portion further includes a wheel aperture 22 utilized for extending a pin or axle located on a rear wheel 12 through to pivotally connect the rear wheel 12 to the wheelchair wheel positioning system 10.

C. Frame Member

The frame member 70 is preferably made of a rigid material that will not significantly distort while supporting the weight of a user and wheelchair during normal usage of the wheelchair wheel positioning system 10. The frame member 70 is preferably metal (e.g. aluminum, titanium), however, is not restricted from being molded in a plastic or composite material.

As best illustrated in FIG. 3B of the drawings, the frame member 70 is preferably a substantially straight and flat structure having a plurality of apertures. The apertures are used for extending fasteners through to attach the frame member 70 to the frame of a wheelchair and for pivotably connecting to the actuation member 20. An additional aperture is utilized for extending a pin 72 or similar fastener through to lock the wheelchair wheel positioning system 10 in a rearward position when used with a locating member 60.

D. Stabilizer Member

The stabilizer member 50 is preferably made of a rigid material that will not significantly distort while supporting the weight of a user and wheelchair during normal usage of the wheelchair wheel positioning system 10. The stabilizer member 50 is preferably metal (e.g. aluminum, titanium), however, is not restricted from being molded in a plastic or composite material.

As best illustrated in FIGS. 3A and 3B of the drawings, the stabilizer member 50 is preferably a substantially straight and flat structure extending from a first end 52 to a second end 54. Located at the first end 52 is a plurality of apertures. The apertures are used for extending fasteners through to attach the stabilizer member 50 to the actuation member 20.

Figure 4A:
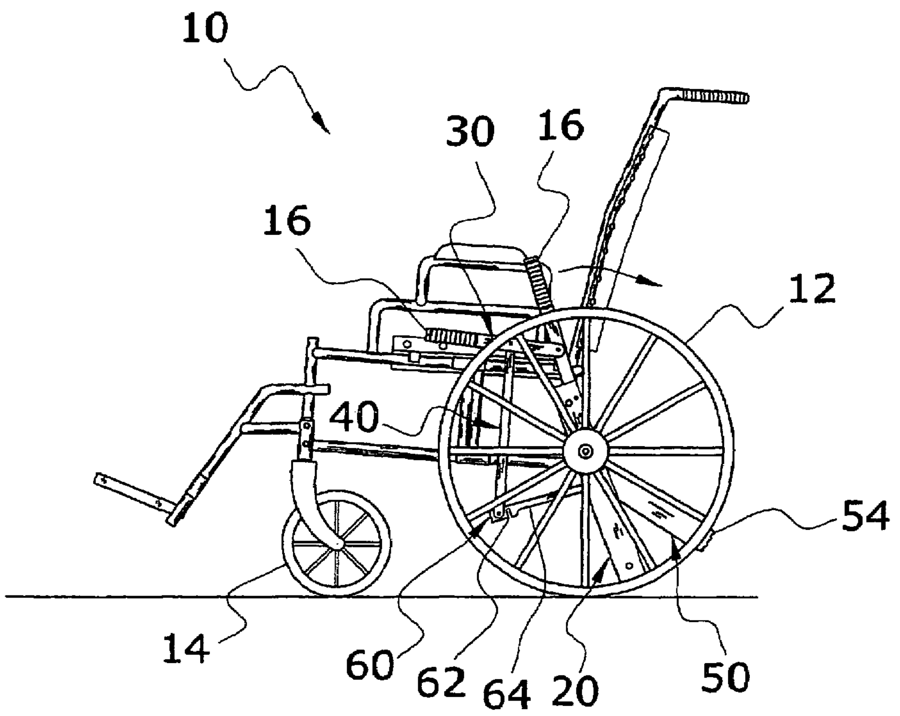
FIG. 4A is a side view of the present invention in the closed position.
Figure 4B:
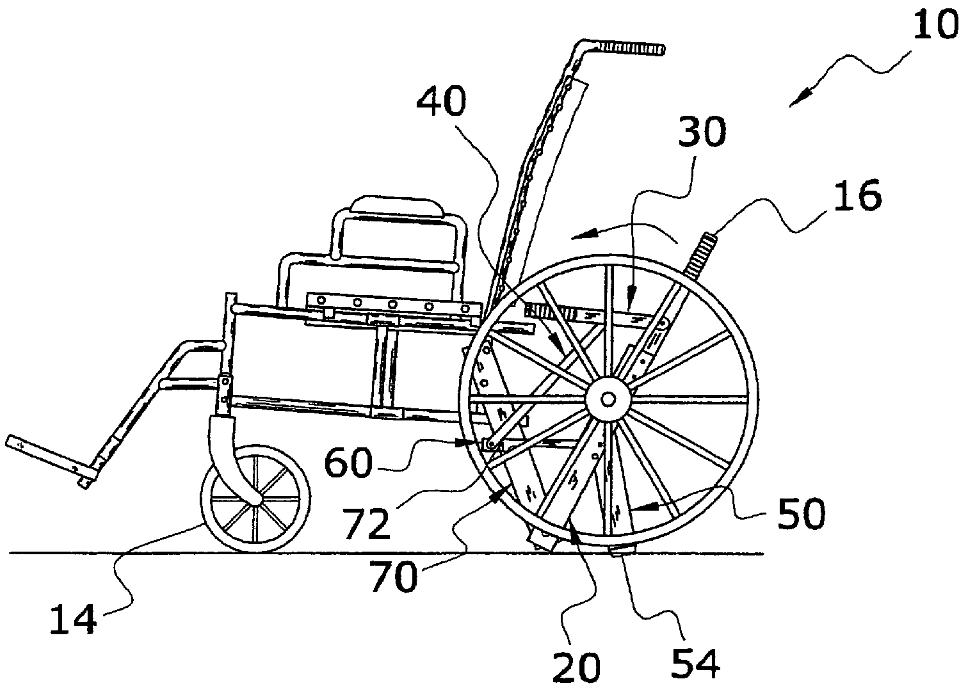
FIG. 4B is a side view of the present invention in the activated position.

As shown in FIGS. 4A and 4B, the stabilizer member 50 is fixedly attached to the actuation member 20 at a preferred angle. The angle assures that the second end 54 of the stabilizer member 50 does not contact the ground when the wheelchair wheel positioning system 10 is in the closed position as shown in FIG. 4A. When the handle portion of the actuation member 20 is rotated rearward about and with the rear wheel 12, the second end 54 of the stabilizer member 50 contacts the ground and lifts the rear wheel 12 off the ground as best shown in FIG. 4B.

The second end 54 of the stabilizer member 50 is preferably covered with a material which prevents the stabilizer member 50 from slipping on or damaging a surface when in contact with floor coverings (e.g. tile, carpet, rugs). The covering material is also preferably resistant to wear in order to withstand contact with outdoor elements (e.g. dirt, gravel, concrete). The covering of the second end 54 can be of the form of a part slid over the second end 54 or a material adhered directly (e.g. spray or dipping) to the second end 54.

E. Lift Member, Connecting Link and Locating Member

The handle member 30, the connecting link 40 and the locating member 60 are preferably made of a rigid material that will not significantly distort during normal usage of the wheelchair wheel positioning system 10. The handle member 30, the connecting link 40 and the locating member 60 are preferably metal (e.g. aluminum, titanium), however, is not restricted from being molded in a plastic or composite material.

As shown in FIGS. 3A and 3B, the handle member 30 is sized similar to the handle portion of the actuation member 20 and is a substantially straight structure or bar. The handle member 30 preferably has an aperture located at one end for pivotally connecting to the actuation member 20 and another aperture located near the center for pivotally connecting to the connecting link 40. Preferably located at the end opposite the end connected to the actuation member 20 is a grip 16 to aid the user.

As best illustrated in FIGS. 3A and 3B the connecting link 40 is preferably a substantially straight structure or bar having apertures located at each end. The apertures are preferably sized for extending fasteners through to pivotally attach to the handle member 30 and locating member 60.

As also shown in FIGS. 3A and 3B of the drawings, the locating member 60 is preferably a manufactured (e.g. laser cut) structure having a plurality of features. Located at each end are apertures sized for extending fasteners through to pivotally attach to the connecting link 40 and actuation member 20. Located towards one end of the locating member 60 is a first notch 62 sized to receive the pin 72 located in the frame member 70. Extending from near the first notch 62 towards the end connected to the actuation member 20 is a second notch 64 used to guide the locating member 60 through the range of motion of the wheelchair wheel positioning system 10 on the pin located in the frame member 70.

F. Operation of the Invention

In use, the wheelchair wheel positioning system 10, is preferably used to reposition a rear wheel 12 of the wheelchair to create an unobstructed path for a user to enter or exit the wheelchair. The wheelchair wheel positioning system 10 is located on the wheelchair allowing the user or an assistant to manipulate and reposition the rear wheel 12 as required.

As illustrated in FIGS. 1A through 2B, 4A and 4B the wheelchair wheel positioning system 10 is attached to the left rear wheel 12 of the wheelchair. However it can be appreciated by one skilled in the art that the wheelchair wheel positioning system 10 could also be attached to the right rear wheel 12 or possibly both rear wheels 12 as required by the user.

Figure 2A:
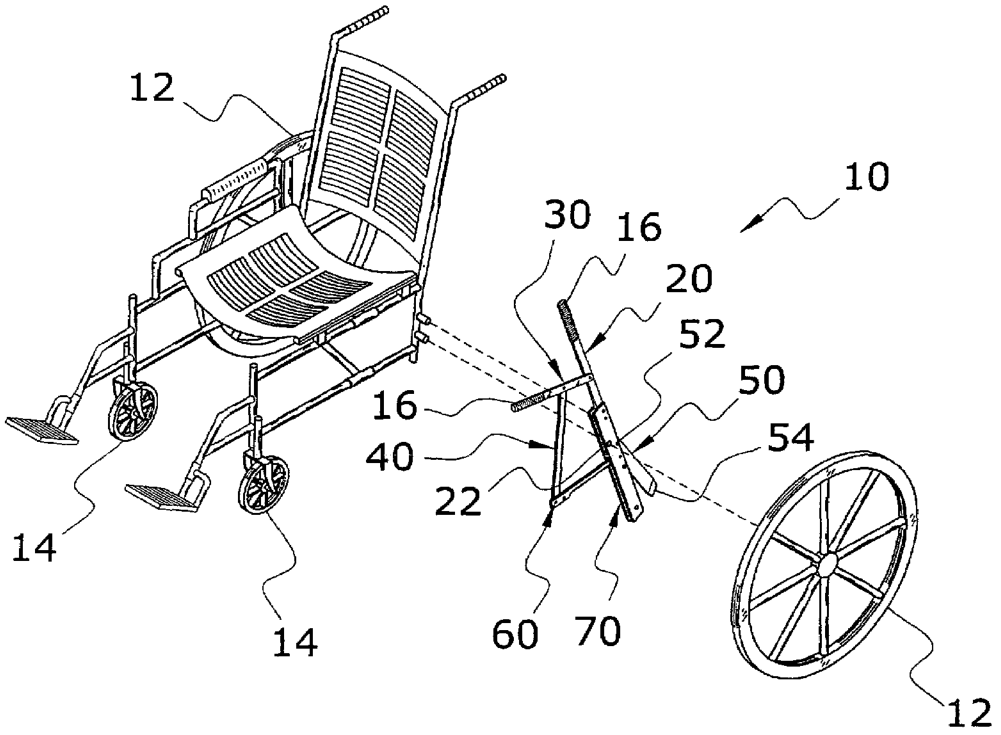
FIG. 2A is an exploded upper perspective view of the present invention.

As best shown in FIGS. 1A, 2A and 4A of the drawings, in the closed position, the wheelchair wheel positioning system 10 allows the user to propel each rear wheel 12 and directionally control each front wheel 14 as normally manipulated without hindrance. The handle portion of the actuation member 20 is positioned substantially vertical to either side or both sides of the seat allowing the user to access each rear wheel 12 as required.

Figure 1B:
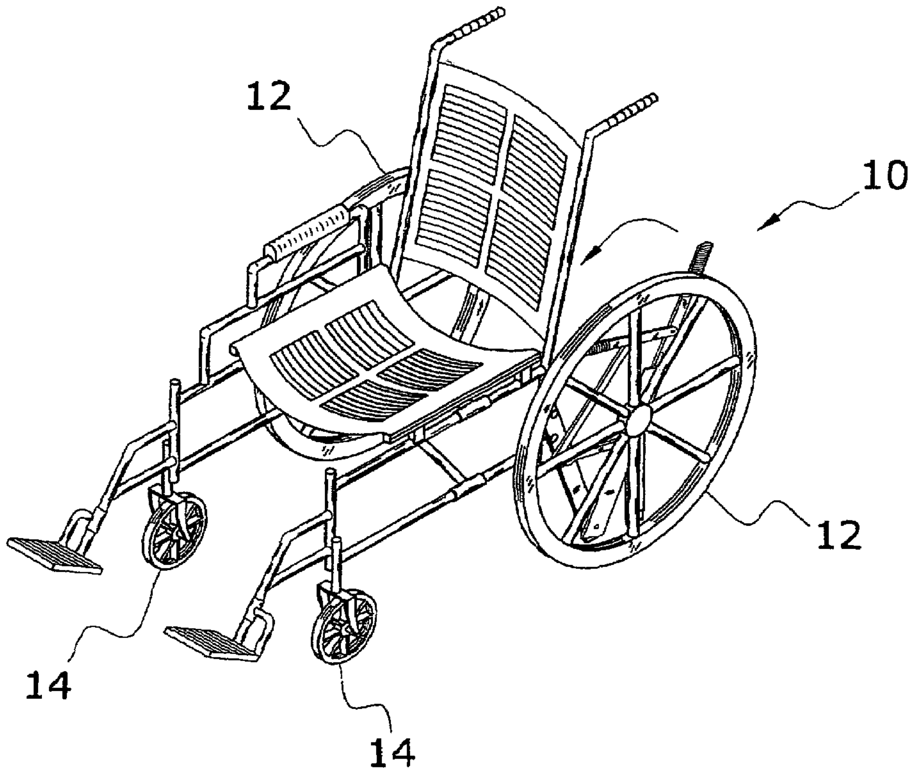
FIG. 1B is an upper perspective view of the present invention with a rear wheel moved rearwards.
Figure 2B:
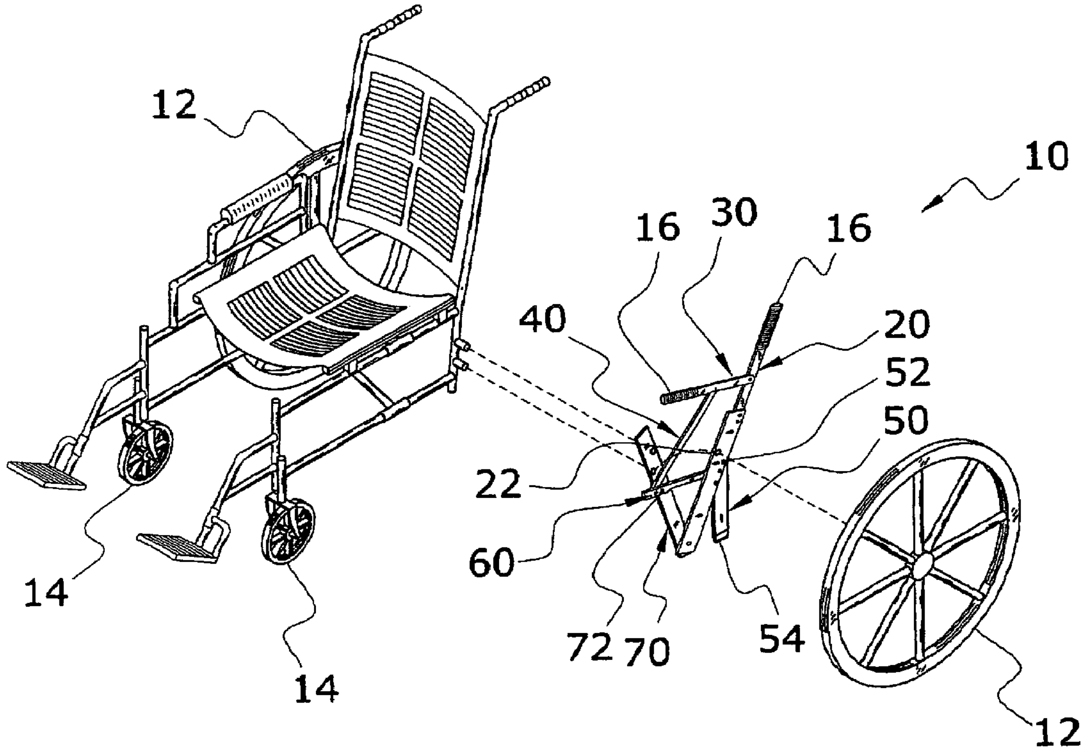
FIG. 2B is an exploded upper perspective view of the present invention with a rear wheel moved rearwards.

When entry or exit of the wheelchair is required, the user grasps the grip 16 and handle portion of the actuation member 20 and pushes rearward. The force of the push causes the actuation member 20 to shift rearward and rotate about the rear wheel 12 that the wheelchair wheel positioning system 10 is attached. As best shown in FIGS. 1B, 2B and 4B, as the wheelchair wheel positioning system 10 rotates rearward, the stabilizer member 50 contacts the ground or floor and lifts the rear wheel 12 as the actuation member 20 continues rearward.

During the movement of the actuation member 20, the second notch 64 of the locating member 60 is guided upon the pin 72 located in the frame member 70. As the actuation member 20 reaches its rearward position having the stabilizer member 50 in contact with the ground and the rear wheel 12 lifted, the pin 72 exits the second notch 64 and enters the first notch 62 in the locating member 60 and secures the wheelchair wheel positioning system 10 in place. The user is then able to safely enter or exit the wheelchair without either the obstruction of the rear wheel 12 or the wheelchair moving.

To reposition the wheelchair into its normal operational mode, the wheelchair wheel positioning system 10 needs to be moved forward. To initiate the repositioning, the user or assistant must lift the handle member 30 connected to the locating member 60 in order to disengage the first notch 62 from the pin 72 in the frame member 70. With the locating member 60 disengaged from the pin 72, the user or assistant can grasp the grip 16 and handle portion of the actuation member 20 and pull forward. The forward motion of the actuation member 20 causes the wheelchair wheel positioning system 10 to pivot about the second end 54 of the stabilizer member 50, lowering the rear wheel 12 to the ground or floor and moving the rear wheel 12 to its normal operating position as best shown in FIGS. 1A, 2A and 4A.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims (and their equivalents) in which all terms are meant in their broadest reasonable sense unless otherwise indicated. Any headings utilized within the description are for convenience only and have no legal or limiting effect.

I claim:

1. A wheelchair wheel positioning system, hereinafter called a wheelchair accessory, comprising:
- a wheelchair, which is required for mounting the wheelchair accessory;
- a frame member (70) connected to the framework of wheelchair;
- an actuation member (20) pivotally-connected to frame member (70) and a rear wheel of wheelchair; and;
- a stabilizing member (50) attached to actuation member (20); and,
- a handle member (30) pivotally connected to actuation member (20);
- a locating member (60) pivotally connected to actuation member, wherein the locating member (60) includes a front and an aft notch for receiving pin (72); and;
- a connecting link (40) pivotally connected to handle, member (30) and locating member (60).

2. A wheelchair accessory of claim 1, comprising a wheelchair, which is required for mounting the wheelchair accessory and provides a safe transfer for the user by moving either or both rear wheels rearward, clear of the wheelchair seat, and locking the wheelchair in position during transfers; a frame member (70) connected to the framework of wheelchair at an angle of approximately 20 degrees; an actuation member (20) pivotally connected to frame member (70) and a rear wheel of wheelchair; and; a stabilizing member (50) attached to actuation member (20); and, a handle (30) including a grip pivotally connected to actuation member (20); a locating member (60) pivotally connected to actuation member (20), wherein the locating member (60) includes a front and an aft notch for receiving pin (72); and; a connecting link (40) pivotally connected to handle member (30) and locating member (60); a stabilizing member (50) is attached to actuation member (20) at an angle of approximately 27 degrees, wherein the lower end of stabilizing member (50) extends beyond the perimeter of the rear wheel, and wherein stabilizing member (50) is positioned approximately vertical to the floor surface when forward notch in locating member (60) aligns with pin (72) in frame member (70), lifting the wheel clear of the floor and locking the wheelchair in a safe position for transferring.

3. The wheelchair accessory of claim 2, wherein the lower end of stabilizing member (50), is covered with a material resistant to slipping to prevent wheelchair from moving during transfers.

4. The wheelchair accessory of claim 2, wherein the lower end of stabilizing member (50), is covered with a material resistant to wear caused by continual use.

* * * * *